United States Patent
Owens

(10) Patent No.: US 11,944,157 B2
(45) Date of Patent: Apr. 2, 2024

(54) 3D DECORATIVE ADD ON

(71) Applicant: Mark Terrence Owens, Oklahoma City, OK (US)

(72) Inventor: Mark Terrence Owens, Oklahoma City, OK (US)

( * ) Notice: Subject to any disclaimer, the term of this patent is extended or adjusted under 35 U.S.C. 154(b) by 0 days.

(21) Appl. No.: 17/648,704

(22) Filed: Jan. 24, 2022

(65) Prior Publication Data

US 2023/0232932 A1    Jul. 27, 2023

(51) Int. Cl.
| | |
|---|---|
| *G09F 21/04* | (2006.01) |
| *A41D 15/00* | (2006.01) |
| *A43B 3/00* | (2022.01) |
| *B60R 13/04* | (2006.01) |
| *G09F 21/02* | (2006.01) |

(52) U.S. Cl.
CPC ............ *A43B 3/0078* (2013.01); *A41D 15/00* (2013.01); *B60R 13/04* (2013.01); *G09F 21/023* (2020.05); *G09F 21/04* (2013.01); *A41D 2400/70* (2013.01)

(58) Field of Classification Search
CPC ..... G09F 21/023; G09F 21/04; A43B 3/0078; A41D 15/00; A41D 2400/70; B60R 13/04
See application file for complete search history.

(56) References Cited

U.S. PATENT DOCUMENTS

| | | | | |
|---|---|---|---|---|
| 4,517,230 | A * | 5/1985 | Crawford | F41H 3/00 |
| | | | | 428/17 |
| 4,536,975 | A * | 8/1985 | Harrell | A45C 11/32 |
| | | | | 2/245 |
| 6,115,948 | A * | 9/2000 | Mitchell | A43B 23/024 |
| | | | | 2/245 |
| 6,701,649 | B1 * | 3/2004 | Brosi | G09F 21/02 |
| | | | | 40/329 |
| 6,729,058 | B2 * | 5/2004 | Ferguson | A43B 3/0078 |
| | | | | 40/772 |
| 10,984,685 | B1 * | 4/2021 | Kempisty | A41D 29/00 |
| 2002/0170147 | A1 * | 11/2002 | Heller | A45F 5/02 |
| | | | | 24/303 |
| 2007/0186390 | A1 * | 8/2007 | Johnston | A44C 3/001 |
| | | | | 24/3.1 |
| 2009/0188141 | A1 * | 7/2009 | Asbery | G09F 7/18 |
| | | | | 40/535 |
| 2009/0282608 | A1 * | 11/2009 | Owens | A43B 3/0078 |
| | | | | 2/244 |

(Continued)

*Primary Examiner* — Gary C Hoge

(57) ABSTRACT

A decorative add-on in accordance with an exemplary embodiment of the present invention is structured and arranged to be attached to an article such as a shoe. The decorative add-on includes an aesthetic portion and an attachment portion. Typically, the aesthetic portion is prominently or noticeably 3D. The attachment portion is removably attached to the shoe. The attachment portion has a medial section, and two elongate insert sections at opposite sides of the medial section. The medial section is fixed to an inner side of the aesthetic portion. The insert sections are slidingly engaged in two matching elongate sheaths provided on the shoe. The attachment portion can be made of flexible resilient material. This facilitates convenient insertion of the insert sections into the sheaths, and secure retention of the insert sections in the sheaths. Further or alternatively, the insert sections can include magnetic material and flexible, resilient material.

13 Claims, 8 Drawing Sheets

(56) References Cited

U.S. PATENT DOCUMENTS

| | | | | |
|---|---|---|---|---|
| 2011/0004977 | A1* | 1/2011 | Port | G09F 21/02 |
| | | | | 2/246 |
| 2011/0307994 | A1* | 12/2011 | Woloschuk | A41D 27/08 |
| | | | | 2/102 |
| 2012/0233897 | A1* | 9/2012 | Gold | G09F 21/04 |
| | | | | 40/606.15 |
| 2014/0053435 | A1* | 2/2014 | Schmitz | A44C 3/001 |
| | | | | 40/1.5 |
| 2014/0338694 | A1* | 11/2014 | Van Dyne | A44C 25/007 |
| | | | | 132/275 |
| 2017/0006976 | A1* | 1/2017 | D'Ercole | G09F 3/12 |
| 2020/0077056 | A1* | 3/2020 | Ha | H04N 9/3141 |
| 2021/0169046 | A1* | 6/2021 | Carver | G09F 21/023 |
| 2021/0345718 | A1* | 11/2021 | Moore | A42B 1/004 |

* cited by examiner

3D DECORATIVE ADD ON

BACKGROUND

Field of the Invention

The present invention relates generally to accessories, add-ons and embellishments used to decorate or visually enhance everyday articles, objects, items and structures. More specifically, the present invention relates to three-dimensional accessories, add-ons and embellishments that can be attached to various things such as shoes, clothing, personal effects, devices, cars, buildings, and so on.

Description of Related Art

Many people enjoy decorating their possessions in various ways, to enhance the appearance of the possession or for novelty or amusement. Various accessories, add-ons and embellishments are also used for other purposes such as advertising. There are almost countless types of accessories, add-ons and embellishments used on people's belongings and other objects. However, many or most of them are thin and flat, often corresponding to a surface of an object that they cover. Such accessories, add-ons and embellishments may be relatively unobtrusive or inconspicuous. This may diminish their attractiveness, appeal or noticeability.

What is needed is a means to overcome the above-described kinds of shortcomings.

BRIEF SUMMARY

A decorative add-on in accordance with an exemplary embodiment of the present invention is structured and arranged to be removably attached to an article such as a shoe. The decorative add-on includes an aesthetic portion (decorative portion) and an attachment portion. Typically, the aesthetic portion is prominently or noticeably 3D. The attachment portion is removably attached to the shoe. The aesthetic portion and the attachment portion can be separate pieces fixed to each other.

The aesthetic portion can have any shape, size, design, color(s) and other features as desired. In the exemplary embodiment, the attachment portion is elongate, flat and thin. The attachment portion has a medial section, and two elongate insert sections at opposite sides of the medial section. The medial section is fixed to an inner side of the aesthetic portion. Length by width dimensions of the attachment portion are less than length by width dimensions of the aesthetic portion. The smaller length by width dimensions and the thinness of the attachment portion enhance the visible prominence of the aesthetic portion.

The insert sections of the attachment portion are slidingly engaged in two matching receptacles provided on the shoe. In the exemplary embodiment, the receptacles are in the form of elongate pockets or sheaths. The attachment portion can be made of flexible resilient material, such as flexible resilient plastic. This facilitates convenient insertion of the insert sections into the sheaths, and secure retention of the insert sections in the sheaths. Further or alternatively, the insert sections can include magnetic material and flexible, resilient material. Further or alternatively, the insert sections can be interferingly engaged in the sheaths.

In another exemplary embodiment of the present invention, the decorative add-on is attachable to another kind of article such as a shirt.

In a further exemplary embodiment of the present invention, a decorative add-on is attachable to a front side of a housing of an exterior rear view mirror of a motor vehicle such as a car. Insert sections of an attachment portion of the decorative add-on can be magnetic, corresponding to ferromagnetic receptacles provided on the housing.

In a still further exemplary embodiment of the present invention, a decorative add-on is attached to a facade of a building.

DETAILED DESCRIPTION OF EMBODIMENTS

Figure 1A:
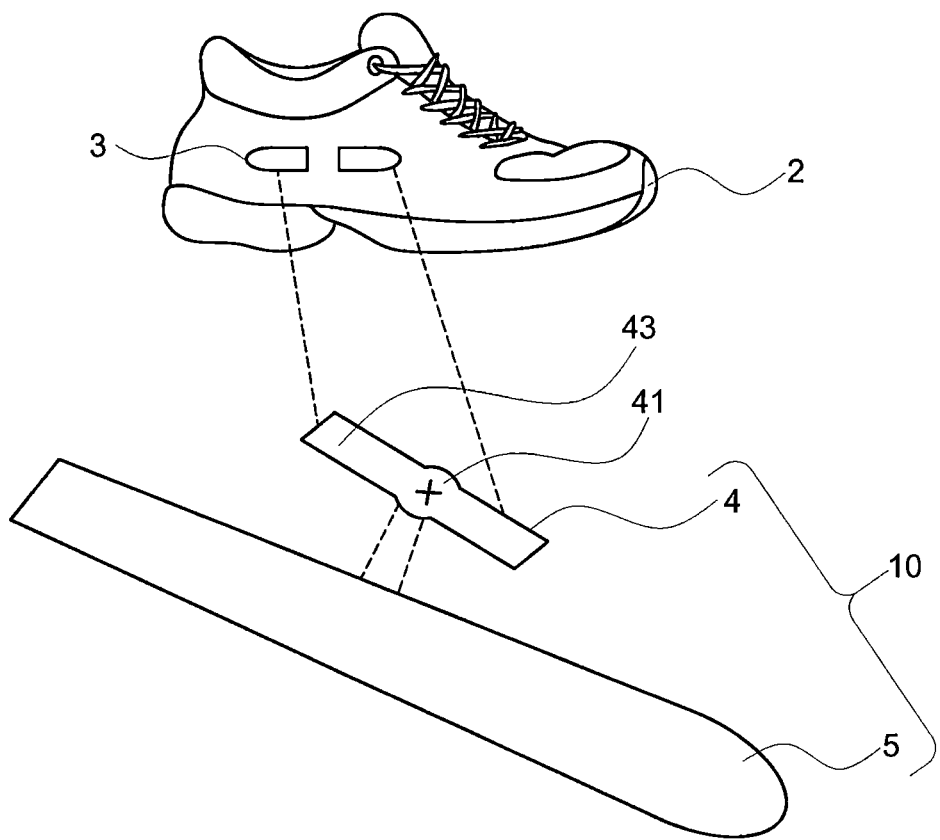
FIG. 1A is a schematic, exploded, perspective view of a three-dimensional (3D) decorative add-on in accordance with a first exemplary embodiment of the present invention, together with an exemplary shoe.

Referring to FIG. 1A, a decorative add-on 10 in accordance with a first exemplary embodiment of the present invention includes an aesthetic portion (decorative portion) 5 and an attachment portion 4. Typically, the aesthetic portion 5 is prominently or noticeably 3D, although such structure is shown in simplified form in FIG. 1A. The attachment portion 4 is structured and arranged to allow attachment of the decorative add-on 10 to an article such as a shoe 2. The aesthetic portion 5 and the attachment portion 4 can be made of plastic, rubber, metal, or any suitable or desired material. The plastic can be flexible resilient plastic for example. The aesthetic portion 5 and the attachment portion 4 are separate pieces, fixed to each other by suitable means such as a split pin, adhesive, heat bonding (thermal bonding or melt bonding), and so on.

The aesthetic portion 5 can have any shape, size, design, color(s) and other features as desired. In the present embodiment, the aesthetic portion 5 is shown as a decorative elongate surfboard shape. The attachment portion 4 is elongate, flat and thin. The attachment portion 4 has a medial section 41, and two elongate insert sections 43 at opposite sides of the medial section 41 respectively. The insert sections 43 extend in mutually opposite directions away from the medial section 41. The medial section 41 is fixed to an inner side of a medial section of the aesthetic portion 5. The fixing can be by way of a split pin provided on the medial section of the aesthetic portion 5 piercing and holding the medial section 41 of the attachment portion 4.

Further or alternatively, the fixing can be by way of adhesive, heat bonding, etc. Length by width dimensions of the attachment portion 4 are much less than length by width dimensions of the aesthetic portion 5. In this embodiment, a thickness (depth) of the attachment portion 4 is substantially uniform. A thickness (depth) of the aesthetic portion 5 is approximately or substantially uniform. The small length by width dimensions and the thinness of the attachment portion 4 enhance the visible prominence of the aesthetic portion 5.

Figure 1B:
FIG. 1B is similar to FIG. 1A, but showing the decorative add-on assembled and attached to the shoe.

Referring also to FIG. 1B, the insert sections 43 of the attachment portion 4 are slidingly engageable in two matching receptacles 3 provided on an outer lateral side of the shoe 2. Typically, the insert sections 43 are resiliently deformed to allow their insertion into the receptacles 3. In this embodiment, the receptacles 3 are in the form of elongate pockets or sheaths 3. The attachment portion 4 and/or the aesthetic portion 5 can be made of flexible resilient material, such as flexible resilient plastic. The sheaths 3 can be made of a same material as the material of the outer lateral side of the shoe 2. This facilitates convenient insertion of the insert sections 43 into the sheaths 3, and secure retention of the insert sections 43 in the sheaths 3. Further or alternatively, the insert sections 43 are interferingly retained in the sheaths 3.

In the various embodiments, the decorative add-on 10 is readily removable from the shoe 2 when desired. Different decorative add-ons 10 can be provided, with each decorative add-on 10 having a unique and attractive design. A given decorative add-on 10 can be removed from the shoe 2 and replaced with another decorative add-on 10 having a desired design. That is, the various decorative add-ons 10 are interchangeable.

In an alternative embodiment, the attachment portion 4 can have a single insert section 43 only. In such case, typically, the insert section 43 is interferingly retained in a corresponding sheath 3.

In another alternative embodiment, the attachment portion 4 and the aesthetic portion 5 are indivisible parts of a single continuous body, integrally molded as a unitary piece of material.

In further alternative embodiments, the attachment portion 4 can be attached to an article such as the shoe 2 by Velcro®. A strip of Velcro® can be fixed to the inner side of the attachment portion 4. The strip of Velcro® of the attachment portion 4 can have tiny loops, corresponding to a strip of Velcro® having tiny flexible hooks provided on the shoe 2. Alternatively, the strip of Velcro® of the attachment portion 4 can have tiny flexible hooks, corresponding to a strip of Velcro® having tiny loops provided on the shoe 2. In other alternative embodiments, the attachment portion 4 itself can be a strip of Velcro®.

Figure 2A:
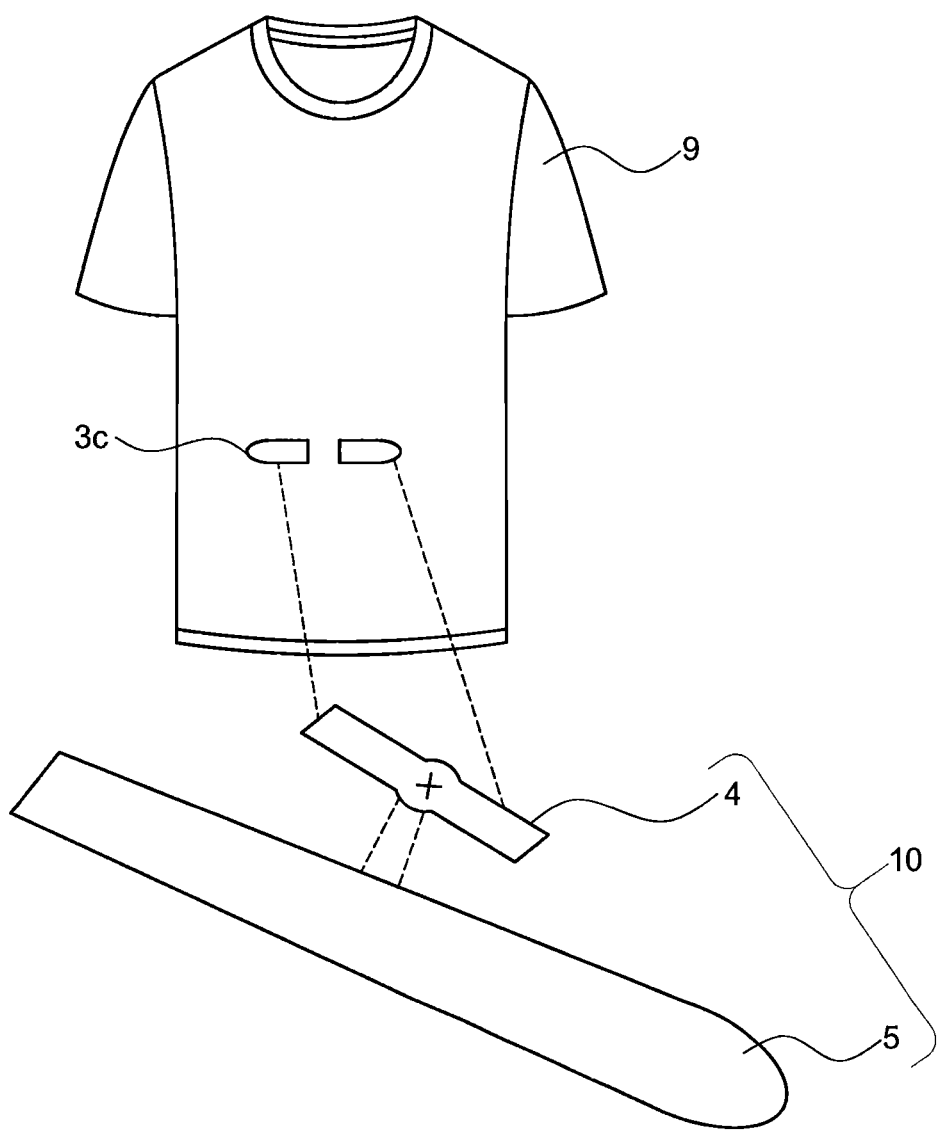
FIG. 2A is a schematic, exploded, perspective view of the 3D decorative add-on of FIG. 1A, together with an exemplary shirt.
Figure 2B:
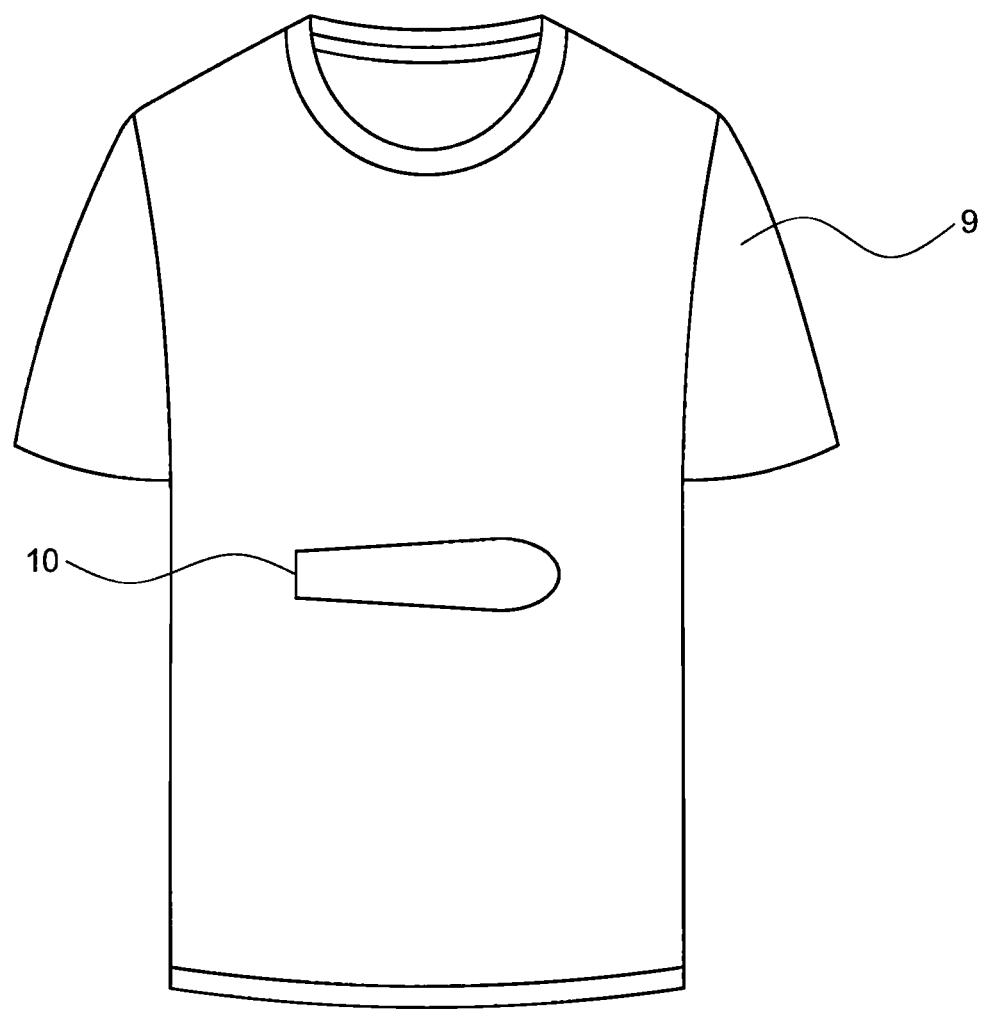
FIG. 2B is similar to FIG. 2A, but showing the decorative add-on assembled and attached to the shirt.

Referring to FIGS. 2A and 2B, the decorative add-on 10 can be attached to another kind of article such as a shirt 9. The insert sections 43 of the attachment portion 4 are slidingly engageable in two matching receptacles 3c provided on a front of the shirt 9. In this embodiment, the receptacles 3c are in the form of elongate pockets or sheaths 3c. The sheaths 3c can be made of a same material as the material of the front of the shirt 9. The principles and structure of the decorative add-on 10 in relation to the shirt 9 are similar to the principles and structure of the decorative add-on 10 in relation to the shoe 2.

Figure 3A:
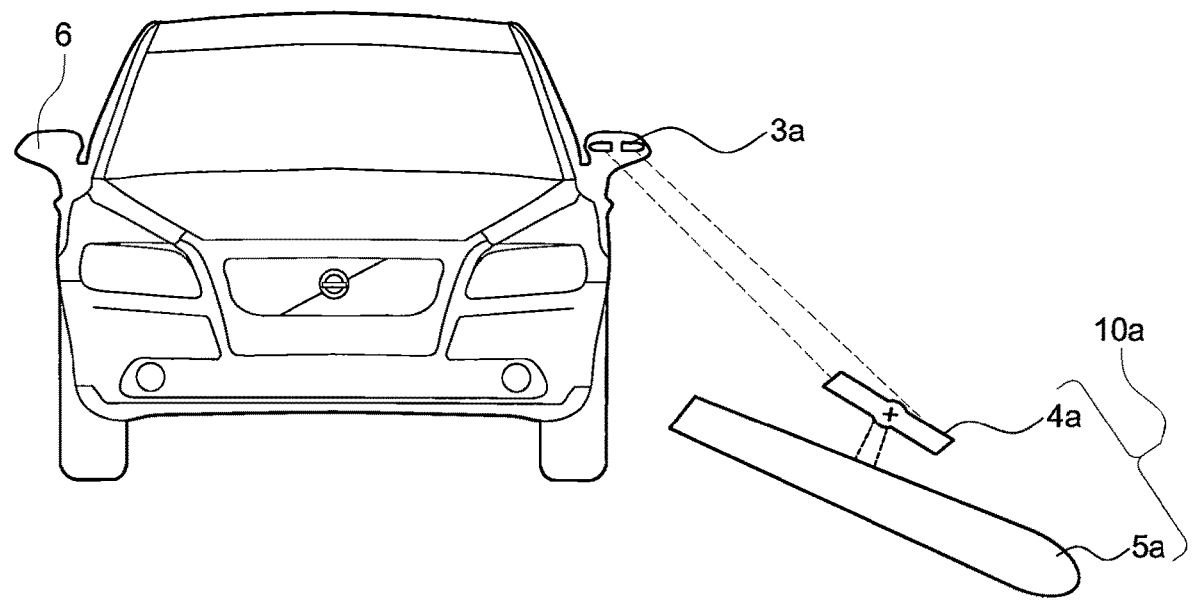
FIG. 3A is a schematic, exploded, front plan view of a 3D decorative add-on in accordance with a second exemplary embodiment of the present invention, together with an exemplary motor vehicle including an external rear view mirror housing.
Figure 3B:
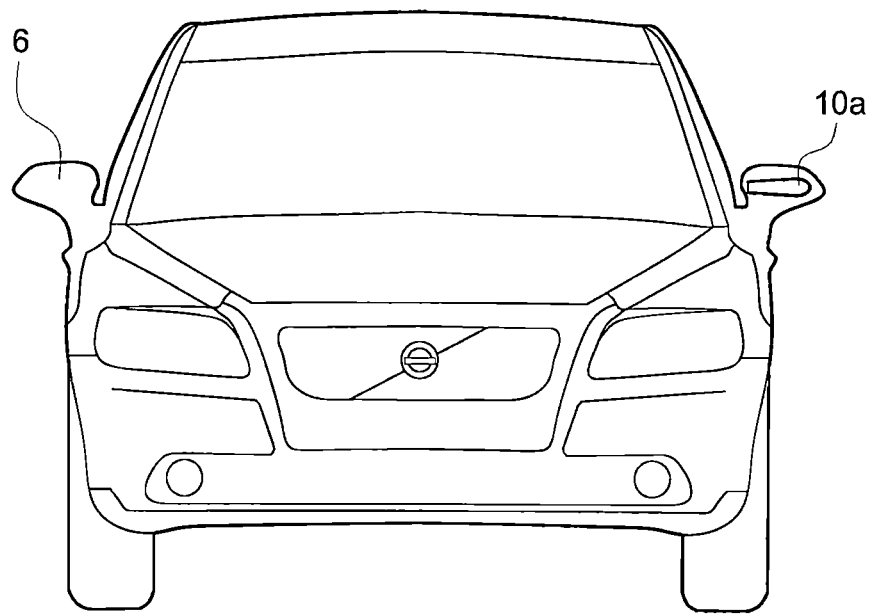
FIG. 3B is similar to FIG. 3A, but showing the decorative add-on assembled and attached to the mirror housing.

Referring to FIGS. 3A and 3B, a decorative add-on 10a in accordance with a second exemplary embodiment of the present invention includes an aesthetic portion 5a and an attachment portion 4a. The decorative add-on 10a is similar in principle and structure to the decorative add-on 10 of the first exemplary embodiment. The decorative add-on 10a is attached to a front side of a housing 6 of an exterior rear view mirror of a motor vehicle such as a car.

Insert sections of the attachment portion 4a are slidingly engageable in two matching receptacles 3a provided at the front side of the housing 6. In this embodiment, the receptacles 3a are in the form of elongate pockets or sheaths 3a. The sheaths 3a can be made of plastic, rubber, metal, or any suitable or desired material, and the front of the housing 6 can be can be made of plastic, metal, or any suitable or desired material. The sheaths 3a can be fixed to a standard housing 6 by suitable means such as adhesive, heat bonding (thermal bonding or melt bonding), and so on. Alternatively, the sheaths 3a and the front side of the housing 6 can be indivisible parts of a single continuous body, integrally molded as a unitary piece of material. The principles and structure of the decorative add-on 10a in relation to the housing 6 are similar to the principles and structure of the decorative add-on 10 in relation to the shoe 2.

In one embodiment, the attachment portion 4a is made of non-magnetic material, such as plastic or rubber. In other embodiments, the attachment portion 4a employs magnetism. For example, the insert sections of the attachment portion 4a are magnets, and/or the front side of the housing 6 is or includes a magnet. When the front side of the housing 6 is or includes a magnet, this can include the sheaths 3a as well. In another embodiment, the whole attachment portion 4a is a magnet. In other embodiments, the insert sections are made of or include magnetic material, or the front side of the housing 6 is made of or includes magnetic material, or both the insert sections and the front side of the housing 6 are made of or include magnetic material. The magnetic material may be, or include, ferromagnetic material. When any of the insert sections and the front side of the housing 6 are not metal but include magnetic material, the other material included can be flexible resilient material such as flexible resilient plastic or flexible resilient rubber.

Thus when the attachment portion 4a employs magnetism, magnetic attraction between the attachment portion 4a and the front side of the housing 6 enhances secure retention of the insert sections in the sheaths 3a.

Figure 4A:
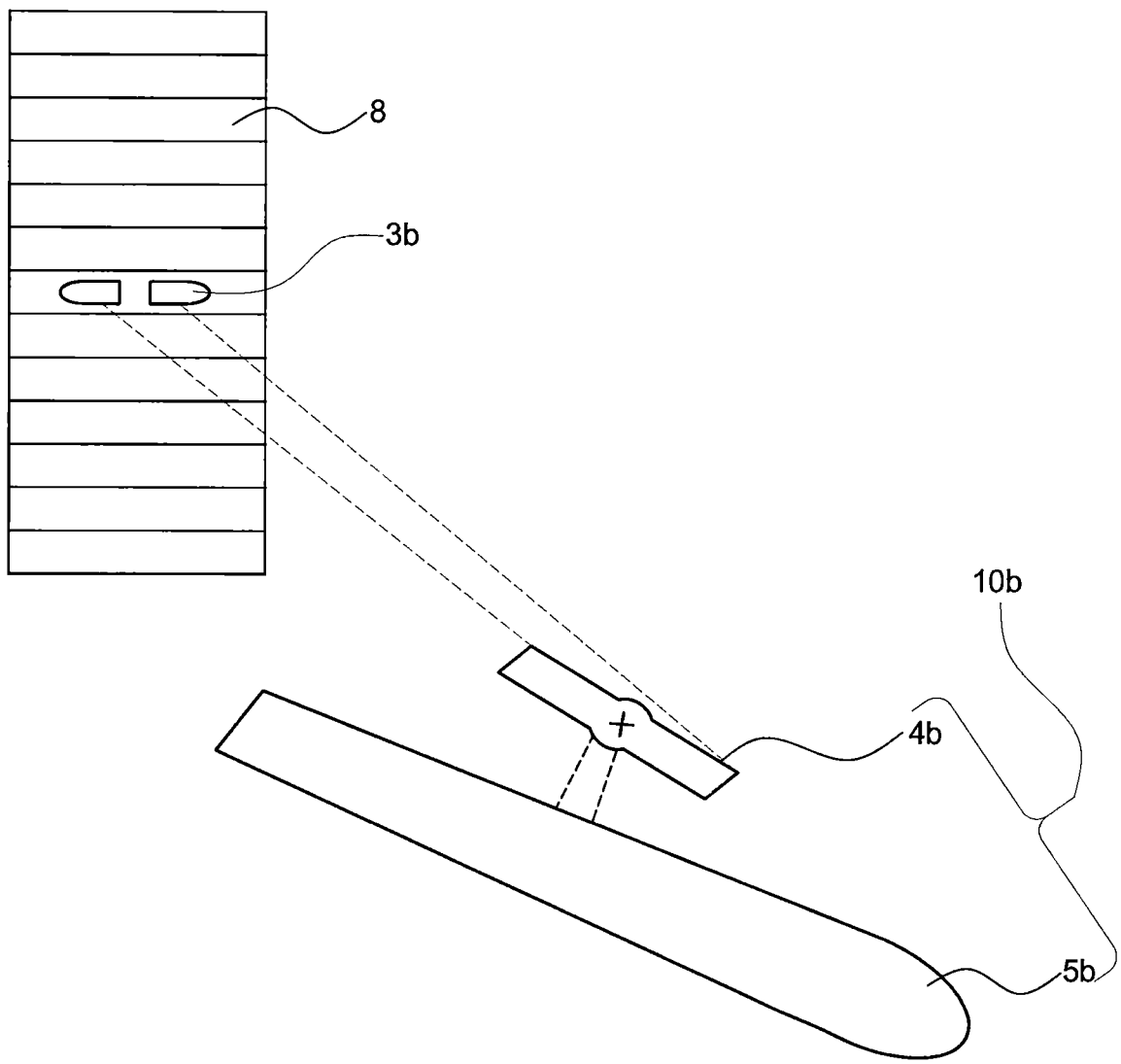
FIG. 4A is a schematic, exploded, front plan view of a 3D decorative add-on in accordance with a third exemplary embodiment of the present invention, together with an exemplary multi-storey building.
Figure 4B:
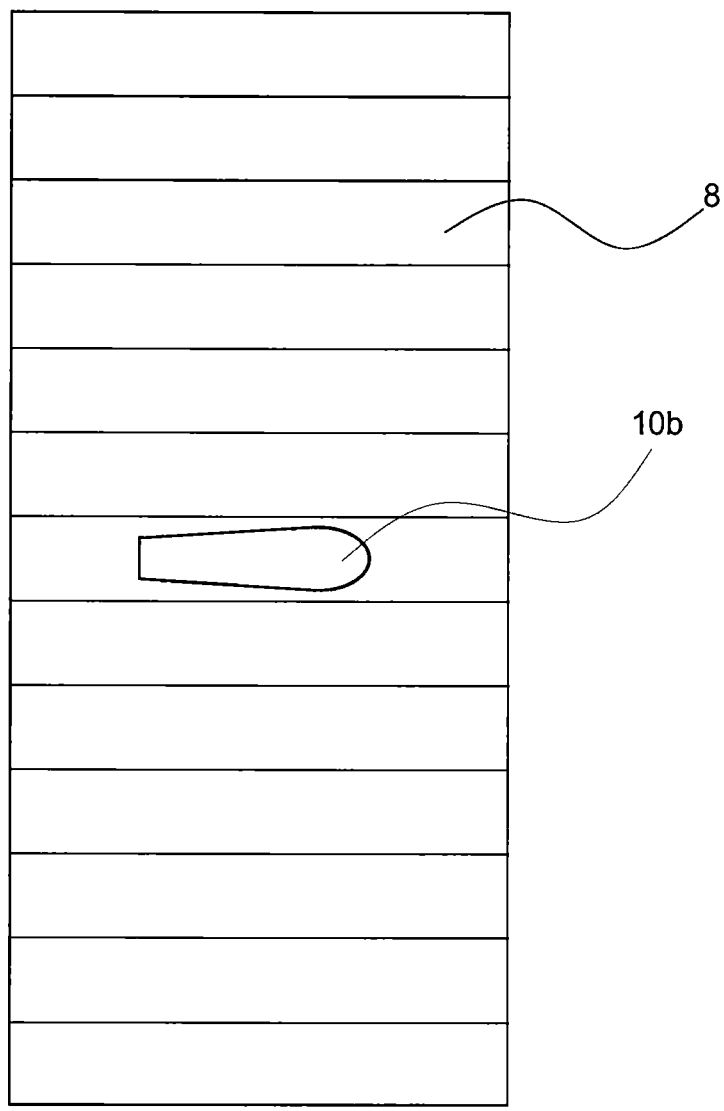
FIG. 4B is similar to FIG. 4A, but showing the decorative add-on assembled and attached to the building.

Referring to FIGS. 4A and 4B, a decorative add-on 10b in accordance with a third exemplary embodiment of the present invention includes an aesthetic portion 5b and an attachment portion 4b. The decorative add-on 10b is similar in principle and structure to the decorative add-on 10 of the first exemplary embodiment. The decorative add-on 10b is attached to an outer side of a building 8. For example, the decorative add-on 10b has a size comparable to that of a part of a facade of the building 8, and is attached to that part of the facade. The principles and structure of the decorative add-on 10b in relation to the building 8 are similar to the principles and structure of the decorative add-on 10 in relation to the shoe 2.

While the foregoing written description of exemplary and preferred embodiments enables one of ordinary skill in the art to make and use the present invention, those of ordinary skill will understand and appreciate the existence of variations, combinations and equivalents of the specific embodiments, systems, methods and examples herein. Accordingly, the present invention should not be limited by the described embodiments, systems, methods and examples herein.

The invention claimed is:

1. A decorative add-on for attaching to an article, the decorative add-on comprising:
   a prominently three-dimensional decorative portion; and an attachment portion adjacent to the decorative portion, wherein the attachment portion comprises at least one insert section for attachment to the article, the at least one insert section comprises magnetic material and flexible resilient material, and the attachment portion is configured to be removably attachable to the article.

2. The decorative add-on of claim 1, wherein the at least one insert section is further configured to be interferingly engaged in the article.

3. The decorative add-on of claim 1, wherein the at least one insert section is a pair of insert sections.

4. The decorative add-on of claim 3, wherein the insert sections are in the form of elongate protrusions, and the elongate protrusions extend in mutually opposite directions from a center of the attachment portion.

5. The decorative add-on of claim 1, wherein the at least one insert section is a flexible magnet.

6. The decorative add-on of claim 1, wherein the attachment portion including the at least one insert section is a magnet.

7. The decorative add-on of claim 1, wherein the attachment portion comprises a medial section, and the decorative portion and the attachment portion are separate pieces fixed to each other at the medial section.

8. The decorative add-on of claim 7, wherein the decorative portion and the attachment portion are adhered to each other.

9. The decorative add-on of claim 7, wherein the decorative portion and the attachment portion are heat bonded to each other.

10. The decorative add-on of claim 1, wherein the decorative portion and the attachment portion are a single unitary piece of material.

11. The decorative add-on of claim 1, wherein length by width dimensions of the attachment portion are less than corresponding length by width dimensions of the decorative portion.

12. A decorative add-on assemblage comprising:
a decorative add-on comprising:
a prominently three-dimensional decorative portion; and
an attachment portion adjacent to the decorative portion; and
at least one receiving member;
wherein the attachment portion comprises at least one insert section deformably and resiliently engageable in the at least one receiving member, at least one of the at least one insert section and the at least one receiving member comprises magnetic material, and the attachment portion is configured to be removably attachable to the at least one receiving member, for positioning of the decorative add-on on an article having the at least one receiving member.

13. The decorative add-on assemblage of claim 12, wherein the at least one insert section is a flexible magnet.

* * * * *